Aug. 19, 1969 J. T. DEL VECCHIO 3,462,203

SAFETY STOP FOR SLIDE MECHANISM

Filed July 19, 1967 3 Sheets-Sheet 1

INVENTOR
JOSEPH T. DEL VECCHIO
BY
Eugene S. Lovette
ATTORNEY

Aug. 19, 1969 J. T. DEL VECCHIO 3,462,203

SAFETY STOP FOR SLIDE MECHANISM

Filed July 19, 1967 3 Sheets-Sheet 2

INVENTOR
JOSEPH T. DEL VECCHIO
BY
Eugene S. Lovette
ATTORNEY

INVENTOR
JOSEPH T. DEL VECCHIO
BY Eugene S. Lovette
ATTORNEY

United States Patent Office 3,462,203
Patented Aug. 19, 1969

3,462,203
SAFETY STOP FOR SLIDE MECHANISM

Joseph T. Del Vecchio, Nanuet, N.Y., assignor to Grant Pulley & Hardware Corp., West Nyack, N.Y., a corporation of New York Filed July 19, 1967, Ser. No. 654,557
Int. Cl. F16c *21/00, 29/00;* A47b *88/00*
U.S. Cl. 308—3.6 8 Claims

ABSTRACT OF THE DISCLOSURE

Telescoping slides support a drawer or electronic chassis in a cabinet. A bar-like stop member is pivotally fixed at the rear of each slide. The stop has two similar cam faces on its ends. The stop acts to stop the slide from being pushed in all the way; requires the slide to be pulled back before it can be fully closed; and limits the distance it can be pulled back.

The present invention relates to slide assemblies and, more particularly, to mechanisms for preventing the slamming shut of slides.

Slide mechanisms are used to secure drawers or electronic chassis in cabinets and to allow them to slide in and out. Typically, a chassis is mounted at both sides on sliding mechanisms and a portion of the slides is attached to the cabinet. When it is necessary to change or test components in the chassis, the chassis pulled out of the cabinet, worked upon and pushed back in.

Each of the two slide mechanisms usually consists of three sections; a stationary section, an intermediate section, and an inner section. The sections form a telescoping unit. The stationary section is bolted to the interior of the cabinet. The intermediate section slides within the stationary section. A third (inner) section slides within the intermediate section. The electronic chassis is attached to the inner section. By using three sections, it is possible to completely withdraw the chassis from the cabinet without creating undue stresses due to the considerable weight of the electronic equipment. Limit stops are provided to prevent the intermediate section from being completely withdrawn from the stationary section and for preventing the inner section from being completely withdrawn from the intermediate section. If the chassis is to be detached from the cabinet, the limit stops are unlocked or removed.

A problem often arises when a drawer is closed in a desk or when an electronic chassis is pushed back into a cabinet. If the drawer or chassis is heavy, it may strike the rear of the cabinet with great force and shock. This may be avoided by a construction in which the rear of the chassis does not touch the rear of the cabinet in its closed position. The force of the closing is taken up by the slide sections. But often it is necessary for the rear of the chassis to contact the cabinet. For example, external electrical leads may terminate with connector jacks in the rear interior of the cabinet. The rear of the chassis is provided with mating plugs. An electrical connection is made only when the chassis in its closed position. This type of arrangement may be desirable if high voltages are involved. It prevents workmen from obtaining access to the electronic equipment when the power is on. If the chassis is slammed shut and the force of impact is too great, the connectors may be damaged or destroyed.

It is the objective of the present invention to provide a slide mechanism which eliminates the possibility of the attached chassis being slammed into the enclosing cabinet with too great an impact.

In accordance with the present invention, a bar-like safety stop is pivotally attached to the stationary section of the slide. When the chassis is slammed shut, the intermediate section and the inner section are telescoped to their closed positions. But, toward the end of its movement the rear of the inner section strikes the safety stop. The safety stop absorbs the force of impact and prevents the inner section from being pushed all the way into the cabinet. In order to continue the inward movement of the chassis, it is necessary to withdraw the chassis slightly. A slight push then closes the chassis into the cabinet.

The safety stop performs two functions. First, it prevents the initial slamming shut of the slide. Secondly, it limits the drawing back of the chassis to a small distance so that when the chassis is pushed in once again, the contact between the rear of the chassis and the cabinet occurs without shock. Without such a limited withdrawal, the chassis might be pushed into the stop, withdrawn a considerable distance releasing the safety stop, and then slammed shut.

It is a feature of this invention to provide a safety stop in a slide mechanism which prevents the complete closure of the slide near the end of its motion.

It is a further feature of this invention to require a slight withdrawal of the slide before its complete closing.

It is still a further feature of this invention to limit the extent to which the slide may be withdrawn after its initial stopping.

Further objectives, features and advantages of my invention will become apparent upon consideration of the following detailed description taken in conjunction with the drawing, in which.

Figures 1, 2, 3:
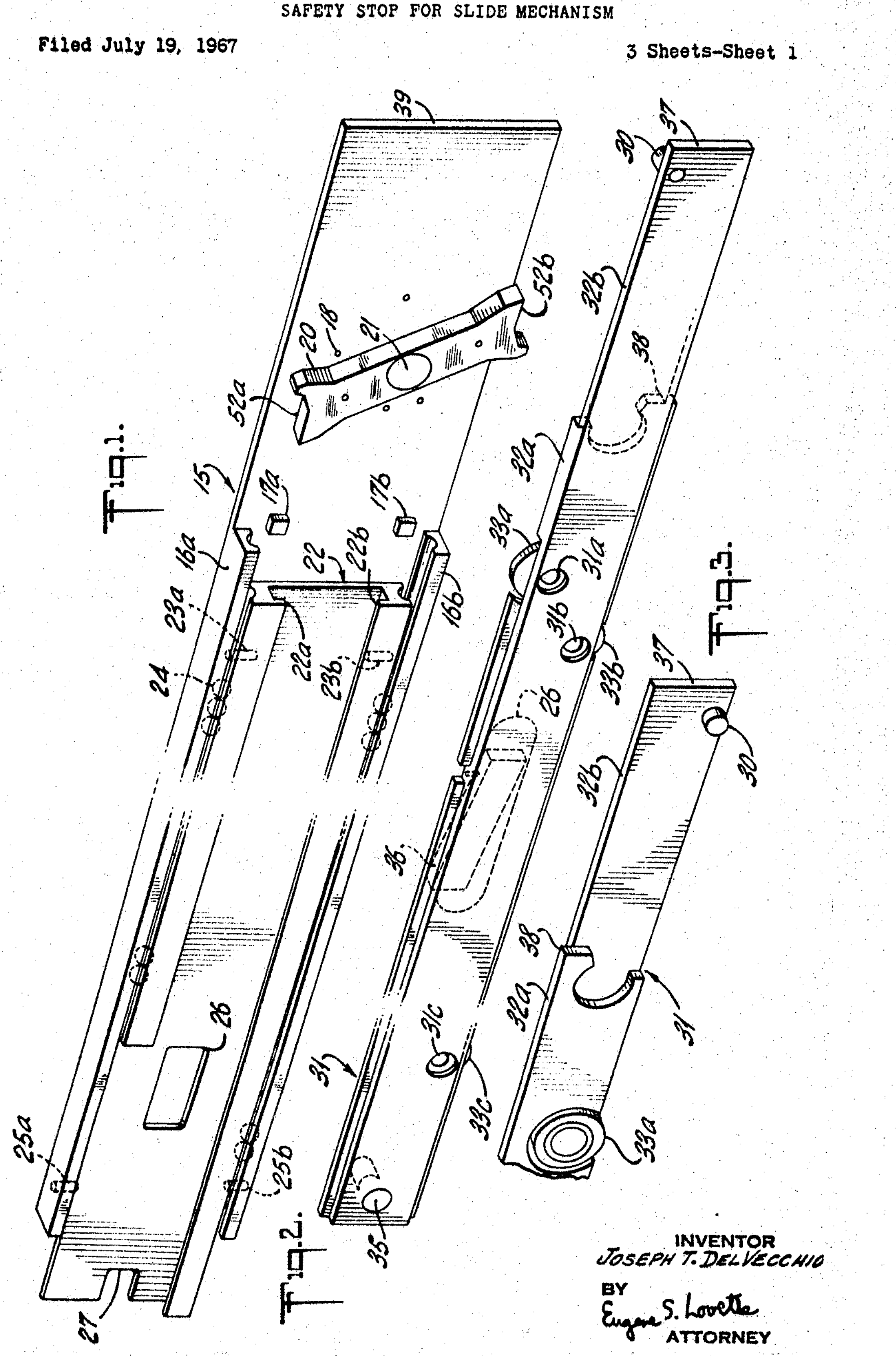
FIG. 1 is a perspective view of illustrative stationary and intermediate slide sections with which the safety stop of the present invention is utilized.
FIG. 2 is a perspective view of the inner section used together with the two slide sections of FIG. 1.
FIG. 3 is a perspective view of the rear end of the other side of the inner section of FIG. 2.

FIGS. 1–3 illustrate a three-section slide mechanism employing the present invention. The safety stop of the invention, however, requires only bar (stop) 20 and its associated elements; pin 30 on the inner section, and the end abutment of the inner section. The operation of the slide mechanism will be described first without reference to these elements. It is to be borne in mind, however, that the invention is applicable to many different types of slide assemblies, such as those having only a stationary section and a single sliding section.

In the slide assembly of FIGS. 1–3, stationary section 15, when used in a cabinet, is rigidly secured to a side wall of the cabinet, e.g., by bolts, not shown in the drawing. Section 15 is an elongated flat rigid member having two raised flange-like channel members 16*a,b* along its edges. The inner faces of channel members 16*a,b* are curved forming a raceway for ball bearings 24 to roll along them.

The intermediate section 22 is telescoped and slides along inside of the stationary section 15. The intermediate section 22 has a flat bottom and two raised flange-like arms along its edges. The arms of section 22 are channeled on their outer surfaces to provide a raceway for ball bearings 24. Pins 23*a,b* in the raceways of slide section 22 prevent the ball bearings 24 from sliding out of their respective channels toward the rear of the assembly. Pins 25*a,b* in channels 16*a,b* of the stationary section 15 prevent the ball bearings 24 from rolling out toward the front of the slide. The two abutments 17*a,b* on section 15 limit inward movement of intermediate section 22, when it is pushed in to close the slide assembly. The intermediate slide section can be pulled out of the stationary section only a predetermined maximum distance. As the intermediate slide is pulled out, pins 23*a,b* force the ball bearings 24 to roll toward the pins 25*a,b*. When the ball bearings are backed against each other and tightly packed between the pins 23*a,b* and 25*a,b* the intermediate section 22 cannot slide further forward.

The inner section 31, shown in FIGS. 2 and 3, slides within the broad and shallow U-shaped channel defined by the interior of intermediate section 22. The freely pivotable rollers 33*a,b,c*, etc., of section 31 fit in the grooves of section 22 which are formed on the inside surface of the arms of section 22. The chassis or other equipment in the cabinet is attached, usually at one of its sides, to the inner section 31. A similar telescoping slide is usually attached to the other side of the chassis or equipment.

The inner section 31 is preferably constructed from two rigid strip members 32*a* and 32*b*. Member 32*b* is provided with a series of circular cut-outs into which the rollers 33*a,b,c* etc., are fitted. The rollers 33*a,b,c* are freely pivotally attached by pins 34*a,b,c* etc., within holes in member 32*b*. The heads of the pins are widened, after assembly, so that they are larger than their holes. Section 32*a* is wide enough so that the inner slide 31 is held against vertical movement by the flanges 22*a,b* of the intermediate section.

After the inner section 15 has been assembled with the intermediate section 22, it is necessary to limit the movement of section 22 in both directions. The rearward movement of section 22 is limited by the abutments 17*a,b*. Its forward movement is limited by the ball bearing 24 being packed between pins 23*a,b* and 25*a,b*.

There are various mechanisms for preventing the chassis and inner section 31 from being completely withdrawn from the intermediate section 22. In the present slide assembly, the intermediate section 22 includes a window 26. The inner section 31 includes a spring-biased latch 36. As the chassis is pulled out the latch remains pressed inward by the top surface of section 22. When the latch 36 reaches window 26, it springs out into the window and prevents further forward motion. To withdraw the chassis from the cabinet, for example to repair it, the latch is manually depressed and allows further forward movement of the inner section 31.

Figure 4:
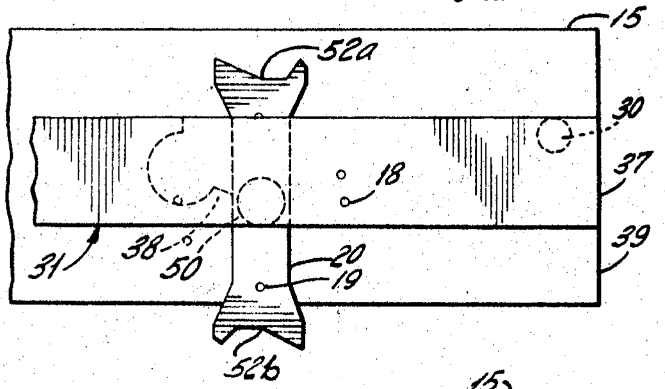
FIGS. 4–11 are top plan views showing the relative positions of the rear end of the stationary slide section, and the rear end of the inner slide section during a complete cycle of operation.
Figure 11:
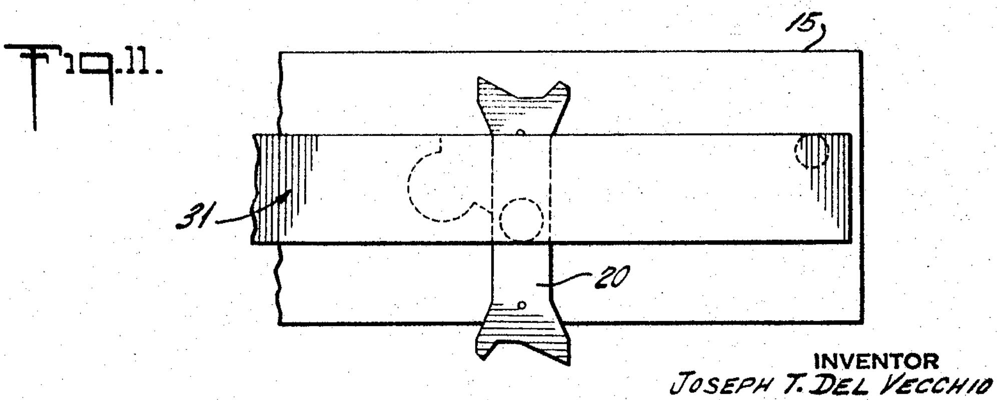

When the slide is completely closed, the rear edge 37 of section 22 may be made flush with the rear edge 39 of the stationary section 15, see FIGS. 4 and 11. The stationary section may be attached to the cabinet such that the rear edge 39 of the stationary section is flush against the rear inner face of the cabinet. The chassis may be attached so that its rear face extends to be flush with edge 37 of the inner section 31. The back of the chassis would be up against the inner face of the cabinet when the slide assembly is closed. The same effect is obtained when the chassis is attached to the inner section with its back extending beyond the rear edge 39 of the inner slide.

FIGS. 4–11 show the relative positions of bar 20 and the inner section 31 during a complete cycle of operation.

In operation, if the slide assembly is in its open position and it is pushed closed, the intermediate section 22 slides toward the rear of the stationary section 15. The two abutments 17*a,b* limit the movement of section 22. The inner section 31 continues to move within the intermediate section 22.

As the slide mechanism is opened and closed, bar (stop) 20 rotates about its pivot pin 21 attached near the rear end of stationary section 15. The bar 20 stops at particular positions and it is desirable that it remain fixed at these points until it is hit by either pin 30 or abutment 38. For this reason, a series of small holes 18 are cut into the inner rear face of the stationary section 15. Two holes are provided near the two ends of bar 20, each hole having a spring and a tiny ball bearing 19. The spring forces the ball bearing out toward the face of the stationary section. As the bar 20 rotates, the ball bearings are forced into holes 18. The spring holding the bearing in the holes is only sufficient to hold the bar locked in position until the application of a force to it by pin 30 or the abutment 38. The holes 18 are placed so that at the end of any movement one of the ball bearings is forced into one of the holes.

In FIG. 4 the slide assembly is shown in its closed position. The bar 20 is vertical to the movement of the slide. The abutment 38 on the side of the inner section 31 is flush against portion 50 of the bar 20. The inner section 31 is prevented from being pushed further back by the bar 20. Force exerted on the inner section 31 inward does not result in movement as the force is directed directly against pivot pin 21. Edge 37 of the inner section is flush with edge 39 of the stationary section, but this is not necessary since the chassis attached to the inner section may extend back to a depth different from that of edge 37.

Figure 5:
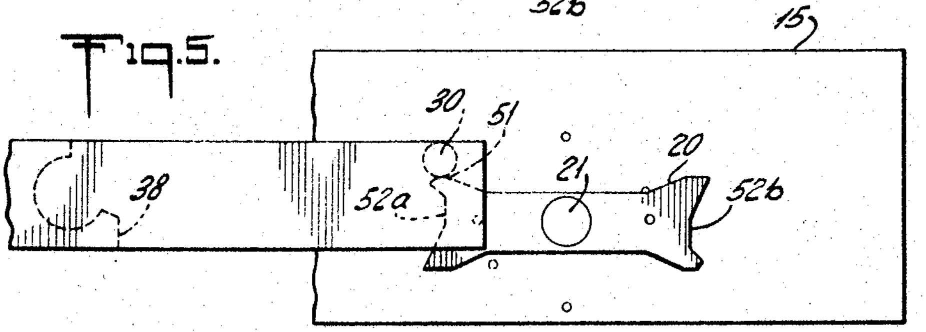

When the chassis is withdrawn from the cabinet, as shown in FIG. 5, the inner section moves to the left. In the course of the movement, pin 30 strikes the bar 20 and causes it to rotate in the counterclockwise direction around its pivot pin 21. The last point of contact between the section 31 and bar 20 is with portion 51 of bar 20

Figure 6:
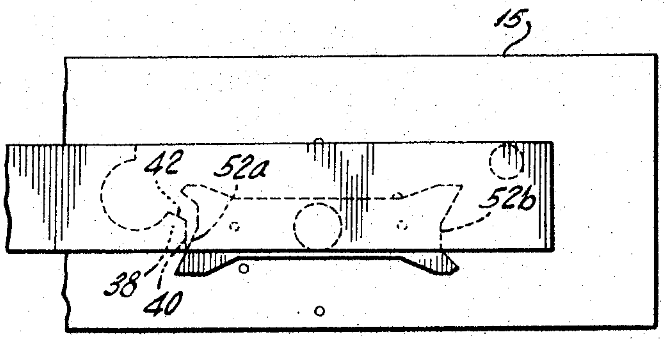

As the slide is withdrawn, the pin 30 clears the bar 20 and consequently when the slide is closed the pin passes past the bar, as shown in FIG. 6. Face 52*a* on bar 20 provides a camming action and rotates bar 20 until its nose 53 abuts against face 42 of abutment 38, see FIG. 7. This prevents further counterclockwise rotation of bar 20 and maintains bar 20 in position to stop slide section 31. The force of impact may be considerable if the chassis carried by the slide is heavy. The impact is absorbed by the bar 20 and its pivot pin 21. Even if the chassis is slammed shut, the rear of the chassis cannot strike the cabinet.

Figure 8:
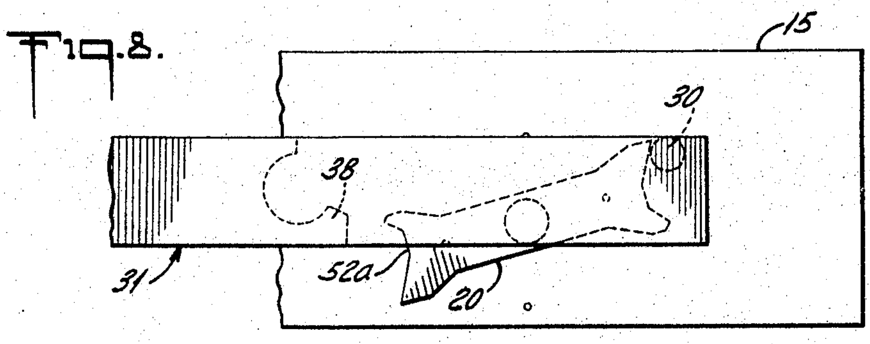

The slide section 31 is again withdrawn and pin 30 strikes against the other face 52*b* of the bar, see FIG. 8. When the pin 30 hits the face 52*b* a counterclockwise torque around the pivot pin 21 is produced and the bar 20 takes another step in its rotation. As the slide section 31 is further withdrawn, pin 30 and the bar assume the positions shown in FIG. 9. Because of the shape of faces 52*a,b* the pin is held and the slide section 21 may not be withdrawn to its full extent. The bar face 52*b* acts as a stop member to limit the withdrawal of the slide section 31.

Figure 7:
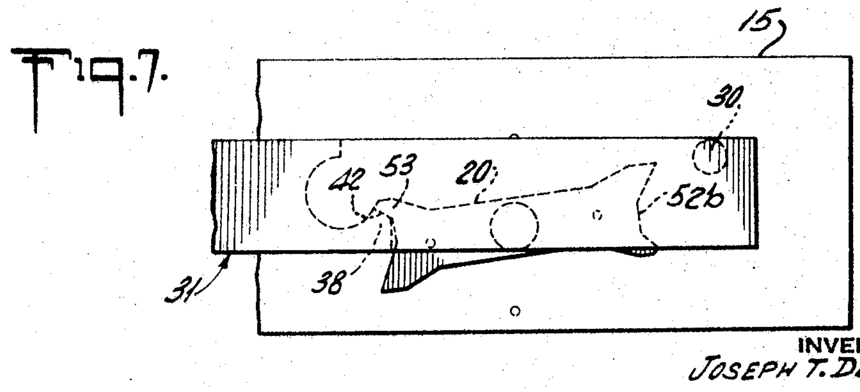
Figure 9:
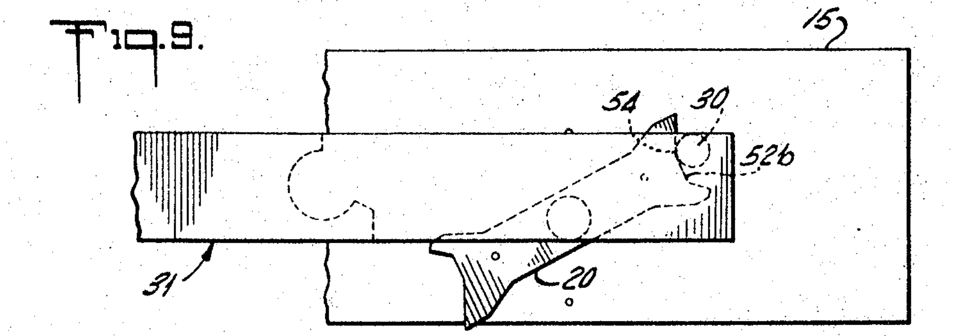
Figure 10:
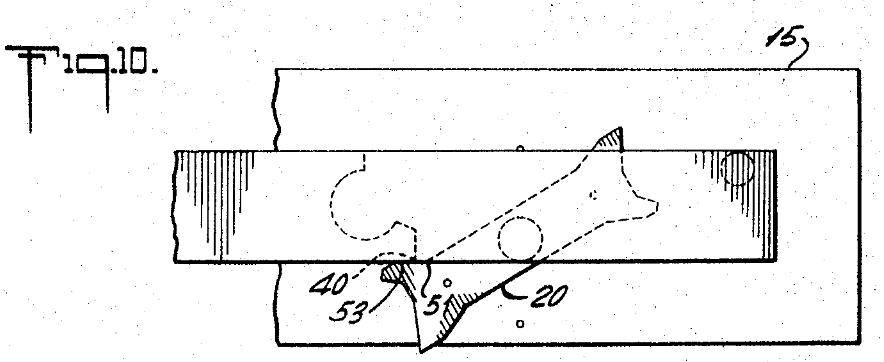

The slight opening movement shown in FIGS. 8 and 9 is required before the slide assembly can be completely closed. If the slide section 31 is not withdrawn sufficiently for pin 30 to index the bar 20 and if an attempt is made to close the slide, the mechanism locks as shown in FIG. 7. Preferably the distance of pin 30 from abutment 38 is short so that withdrawing movement required to index the bar is short. When the slide assembly is fully closed, the momentum developed is insufficient to damage the chassis and the cabinet.

The opening motion of FIGS. 8 and 9 rotates the bar 20 sufficiently so that edge 40 of slide section 31 is above the nose 53 of bar 20. When the slide assembly is fully closed, the edge 40 hits the bar along its side 51. The counterclockwise torque developed rotates bar 20 to the position shown in FIG. 11. FIG. 11 is identical to FIG. 4 and the bar is placed in a vertical position relative to slide section 31. Bar 20 ceases to rotate and prevents any further movement of the slide, for the reasons described above with reference to FIG. 4. At the termination of the complete cycle of slide operation, the bar has made a 180° turn. The cam ends of the bar are reversed mirror images of one another so that, in effect, the same initial condition is obtained and the same operations and effects take place when the chassis is next withdrawn. "Reversed mirror image" as used in the specification is defined as follows: The two cam ends of the rotatable member bar are identical. However, they are 180° out of phase. Thus, if the rotatable member bar is bisected along either its horizontal or vertical axis, and either half is rotated 180° in either direction while the other half remains fixed, the two halves would coincide. In other words, bisection of the rotatable member having a cam face at each of its ends along either its vertical or horizontal axis followed by the inverting and reversing of one of the halves results in the two halves coinciding.

The illustrative embodiment of the invention is particularly advantageous because a single bar mechanism prevents the slide assembly from being completely closed in the first step, and serves as the limit stop in the third step. As an alternative, separate mechanisms may be used for each of the various functions. In all cases, a mechanism must be provided to limit the initial movement of the slide to prevent it from completely closing when the chassis is first pushed in. To prepare for the final closing, the slide must first be withdrawn. Preferably, a mechanism should be provided to limit the extent of the withdrawal; if it is omitted there is a possibility that the slide will be completely opened and when slammed shut. Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A slide mechanism comprising at least two telescoping slide sections; a rotatable member attached to the first of the sections, the member being pivoted about a pivot point and being rotated in discrete steps through an angle of 180° about the pivot point during a complete cycle of operation, and an abutment on the second of the sections, the rotatable member prevents the complete closing of the sections from an initial open position during a closing movement; means for rotating the rotatable member responsive to an opening movement of the sections following the closing movement; and means for limiting the opening of the sections to less than the maximum open position during the opening movement, the means for rotating further rotating said rotatable member to a position which permits complete closing.

2. A slide mechanism in accordance with claim 1, wherein the limiting means is a cam face on the rotatable member.

3. A slide mechanism is accordance with claim 2 and further including means for maintaining the position of the rotatable member with respect to the first section after each step in the absence of the application of a torque around the pivot point.

4. A slide mechanism in accordance with claim 1 and further including a third intermediate slide section positioned to be telescoped between the first and second sections, the third section being disposed for movement along the first section and the second section being disposed for movement along the third section.

5. A slide mechanism in accordance with claim 1 and further including means for maintaining the position of said rotatable member with respect to said first section after each step in the absence of the application of a torque around said pivot point.

6. A slide assembly comprising at least two telescoping slide sections; stop means, having opposite ends, secured to the first slide section for preventing the second slide section from motion in one direction, the stop means being pivoted at its center for rotation through an angle of 180° about the pivot point when the sections are fully opened and fully closed; a first abutment on the second section for displacing the stop means when the slide sections are first opened; and the second abutment on the second section for moving the displaced stop means during a closing movement to prevent the complete closing of the sections, the first abutment being further operative for shifting the moved stop means during an opening movement following an initial closing movement of the sections and for limiting the opening movement, the second abutment being further operative to actuate the shifted stop means to effect a complete closing of the sections.

7. A slide assembly in accordance with claim 6 wherein the stop means consists of a bar member and a pivot pin, the pivot pin is secured to the first slide section, the bar member is pivotable on the pin, the ends of the bar member are cam-faced and are reversed mirror images of one another, and the first slide section includes securing means adapted to be secured to a cabinet.

8. A slide assembly in accordance with claim 6 further including at least one intermediate slide section disposed between the first and second sections and wherein the first and second abutments on the second section and the stop means on the first section near the rear ends of the sections are such that the various motions of the stop means can be effected when the intermediate slide section is in its closed position.

References Cited

UNITED STATES PATENTS

| | | | |
|---|---|---|---|
| 2,441,678 | 5/1948 | Tietje | 312—348 |
| 2,598,175 | 5/1952 | Jinks | 312—348 |
| 2,599,865 | 6/1952 | Rudman | 312—348 X |
| 2,739,027 | 3/1956 | Gussack | 312—333 |
| 2,809,085 | 10/1957 | Fall | 312—348 X |
| Re. 25,243 | 9/1962 | Kobitter | 312—333 |
| 3,141,714 | 7/1964 | Valitus | 312—348 |
| 3,258,299 | 6/1966 | Meyer | 308—3.8 |

MARTIN P. SCHWADRON, Primary Examiner

LUCIOUS L. JOHNSON, Assistant Examiner

U.S. Cl. X.R.

312—348